UNITED STATES PATENT OFFICE 2,534,585

METHOD OF PRODUCING N-ALKYL ACRYLAMIDES

John G. Erickson, Greenwich, Conn., assignor to American Cyanamid Company, New York, N. Y., a corporation of Maine No Drawing. Application April 15, 1948, Serial No. 21,309

7 Claims. (Cl. 260—561)

The present invention relates to the production of alpha, beta-unsaturated amides, and more particularly to a method of producing N-alkyl acrylamides which conform to the general formula

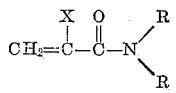

wherein X is a member of the group consisting of hydrogen and the methyl radical, one R represents an alkyl radical, and the remaining R is chosen from the group consisting of hydrogen and an alkyl radical.

It is well known in the art that aliphatic monohydric alcohols react with acrylate esters to form beta-alkoxypropionate esters. These beta-alkoxypropionate esters also react with primary and secondary alkyl amines to form N-alkyl beta-alkoxypropionamides.

It has now been discovered that an N-alkyl acrylamide may be readily produced by heating an N-alkyl beta-alkoxypropionamide of the general formula

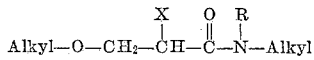

wherein X is a member of the group consisting of hydrogen and the methyl radical, and R is chosen from the group consisting of hydrogen and an alkyl radical, in the vapor phase in the presence of a catalyst for the reaction.

Suitable catalytic materials over which cracking of the N-alkyl beta-alkoxypropionamide takes place include alumina, silica gel, silicon carbide, bauxite, titania, zirconia, thoria, and other rare earth oxides or mixtures thereof.

In accordance with the present invention, cleavage of the N-alkyl beta-alkoxypropionamides may be illustrated by the following typical reaction:

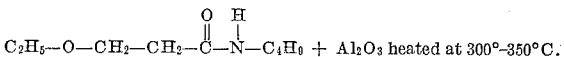

Although the temperature employed in the catalytic cleavage of the aforesaid alkoxypropionamides may be varied within relatively wide limits, it is preferable to maintain the reaction zone at a temperature within the range of from about 250° C. to about 550° C.

The following examples, in which the parts are by weight, further illustrate the invention.

Example 1

46.9 parts of N-butyl beta-ethoxypropionamide were fed at a rate of .014 mol/min. into a vaporizing chamber through which nitrogen gas was passed at a rate of .021 mol/min. The mixed vapors of amide and nitrogen were passed upward through a vertical Pyrex tube (converter) heated at a temperature of approximately 305° C. The lower half of the tube served as a preheater, and the upper half was packed with alumina (8–14 mesh). The product was condensed in a receiving vessel attached directly to the outlet at the upper end of the converter. The contact time, based on the total volume of catalyst, was four seconds. The product from the receiving vessel was distilled under reduced pressure to give 19.5 parts of N-butyl acrylamide, a colorless liquid boiling at 80° C./1 mm.

Example 2

The procedure of Example 1 was repeated using 52 parts of N-butyl beta-methoxypropionamide at a feed rate of .01 mol/min. The temperature of the converter was maintained at approximately 295° C. Distillation of the product from the receiving vessel gave 26.3 parts of N-butyl acrylamide.

Example 3

The procedure of Example 1 was repeated using 51.5 parts of N-butyl beta-methoxyisobutyramide at a feed rate of .009 mol/min. The temperature of the converter was maintained at approximately 325° C. Distillation of the product from the receiving vessel gave 20.3 parts of N-butyl methacrylamide, a colorless liquid boiling at 85° C./1 mm.

Example 4

The procedure of Example 1 was repeated using 50.2 parts of N,N-dibutyl beta-methoxypropionamide at a feed rate of .007 mol/min. The temperature of the converter was maintained at approximately 325° C. Distillation of the product from the receiving vessel gave 10.2 parts of N,N-dibutylacrylamide, a colorless liquid boiling at 70° C./1 mm.

Example 5

The procedure of Example 1 was repeated using 50.5 parts of N-octyl beta-methoxypropionamide at a feed rate of .008 mol/min. The temperature of the converter was maintained at approximately 335° C. Distillation of the product from the receiving vessel gave 15.1 parts of N-octyl acrylamide, a colorless liquid boiling at 115° C./1 mm.

Example 6

The procedure of Example 1 was repeated using 50.5 parts of N-octyl beta-methoxypropionamide at a feed rate of .007 mol/min., and silica gel as the catalyst in place of the alumina. The temperature of the converter was maintained at 330° C. Distillation of the product from the receiver gave 16.6 parts of N-octyl acrylamide.

Example 7

The procedure of Example 1 was repeated using 50.4 parts of N-octyl beta-methoxypropionamide at a feed rate of .007 mol/min. Silicon carbide was employed in the converter in place of the alumina. The temperature of the converter was maintained at approximately 550° C. Distillation of the product from the receiving vessel gave 19.7 parts of N-octyl acrylamide.

In place of the N-alkyl methoxy and ethoxypropionamides employed in the above examples, other N-alkyl beta-alkoxypropionamides may be used, such as the N-alkyl beta-butoxy, hexoxy, decoxy, dodecoxy, and octadecoxypropionamides. Typical alkyl radicals attached to the nitrogen atom also include the methyl, ethyl, propyl, heptyl, decyl, dodecyl, and higher alkyl radicals.

The N-alkyl acrylamides prepared in accordance with the present invention are useful materials for polymerizations, and particularly for mixed polymerizations with other vinyl compounds and dienes to give unique properties to plastic products.

While the invention has been described with particular reference to specific embodiments, it is to be understood that it is not to be limited thereto but is to be construed broadly and restricted solely by the scope of the appended claims.

I claim:

1. A method of producing an N-alkyl acrylamide which comprises heating an N-alkyl beta-alkoxypropionamide of the formula

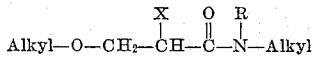

wherein X is a member of the group consisting of hydrogen and the methyl radical, and R is chosen from the group consisting of hydrogen and an alkyl radical, in the vapor phase in the presence of a catalyst for the reaction to form an alkyl alcohol and an N-alkyl acrylamide, and recovering the latter.

2. The method of claim 1 in which the N-alkyl beta-alkoxypropionamide is heated at a temperature within the range of from about 250° C. to about 550° C.

3. A method of producing N-butyl acrylamide which comprises heating N-butyl beta-ethoxypropionamide in the vapor phase in the presence of alumina to form ethyl alcohol and N-butyl acrylamide, and recovering the latter.

4. A method of producing N-butyl methacrylamide which comprises heating N-butyl beta-methoxyisobutyramide in the vapor phase in the presence of alumina to form methyl alcohol and N-butyl methacrylamide, and recovering the latter.

5. A method of producing N,N-dibutyl acrylamide which comprises heating N,N-dibutyl beta-methoxypropionamide in the vapor phase in the presence of alumina to form methyl alcohol and N,N-dibutyl acrylamide, and recovering the latter.

6. A method of producing an N-alkyl acrylamide which comprises passing the vapors of an N-alkyl beta-alkoxypropionamide of the formula

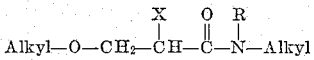

wherein X is a member of the group consisting of hydrogen and the methyl radical, and R is chosen from the group consisting of hydrogen and an alkyl radical, through a reaction zone containing a catalyst for the reaction maintained at a temperature between about 250° C. and about 550° C., condensing the resulting products, and recovering the N-alkyl acrylamide therefrom.

7. A method of producing an N-alkyl acrylamide which comprises passing the vapors of an N-alkyl beta-alkoxypropionamide of the formula

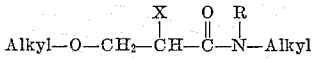

wherein X is a member of the group consisting of hydrogen and the methyl radical, and R is chosen from the group consisting of hydrogen and an alkyl radical, through a pre-heating zone and thence through a reaction zone containing a catalyst for the reaction maintained at a temperature between about 250° C. and about 550° C., condensing the resulting products, and recovering the N-alkyl acrylamide therefrom.

JOHN G. ERICKSON.

REFERENCES CITED

The following references are of record in the file of this patent:

UNITED STATES PATENTS

| Number | Name | Date |
|---|---|---|
| 2,393,000 | Seeger | Jan. 15, 1946 |
| 2,426,885 | Kilgore | Sept. 2, 1947 |

OTHER REFERENCES

Ratchford et al.: "J. Am. Chem. Soc.," vol. 69 (1947), pp. 1911 to 1914.